United States Patent
Colner et al.

(10) Patent No.: US 11,620,617 B2
(45) Date of Patent: *Apr. 4, 2023

(54) COMPENSATION MODELING USING PLAN COLLECTIONS

(71) Applicant: Workday, Inc., Pleasanton, CA (US)

(72) Inventors: Scott Colner, Portland, OR (US); Peter Ryan, San Ramon, CA (US)

(73) Assignee: Workday, Inc., Pleasanton, CA (US)

( * ) Notice: Subject to any disclaimer, the term of this patent is extended or adjusted under 35 U.S.C. 154(b) by 113 days.

This patent is subject to a terminal disclaimer.

(21) Appl. No.: 17/014,654

(22) Filed: Sep. 8, 2020

(65) Prior Publication Data

US 2020/0402018 A1    Dec. 24, 2020

Related U.S. Application Data

(63) Continuation of application No. 15/143,411, filed on Apr. 29, 2016, now Pat. No. 10,817,843.

(51) Int. Cl.
*G06Q 10/10* (2012.01)
*G06Q 10/1057* (2023.01)
*G06Q 40/06* (2012.01)

(52) U.S. Cl.
CPC ......... *G06Q 10/1057* (2013.01); *G06Q 40/06* (2013.01)

(58) Field of Classification Search
CPC ........................... G06Q 10/1057; G06Q 40/06
See application file for complete search history.

(56) References Cited

U.S. PATENT DOCUMENTS

| | | | | |
|---|---|---|---|---|
| 5,819,231 A | * | 10/1998 | Tremaine | G06Q 40/02 705/7.42 |
| 6,862,596 B2 | * | 3/2005 | Thomsen | G06Q 30/06 707/999.102 |
| 7,376,569 B2 | * | 5/2008 | Plunkett | G06Q 30/02 705/320 |
| 8,478,618 B2 | * | 7/2013 | Coleman | G06Q 10/063 705/7.11 |
| 2002/0035506 A1 | * | 3/2002 | Loya | G06Q 30/0217 705/14.19 |

(Continued)

FOREIGN PATENT DOCUMENTS

| | | |
|---|---|---|
| CA | 2486251 | 11/2003 |
| WO | 0111501 | 2/2001 |

(Continued)

OTHER PUBLICATIONS

Sims et al.: Expatriate Compensation: An Exploratory Review of Salient Contextual Factors and Common Practices, Jan. 2005, Emerald Research Register, pp. 98-108. (Year: 2005).*

(Continued)

*Primary Examiner* — Bijendra K Shrestha
(74) *Attorney, Agent, or Firm* — Van Pelt, Yi & James LLP

(57) ABSTRACT

A system for compensation modeling includes an interface and a processor. The interface is to receive live transactional compensation data. The system processor is to determine a set of compensation assignment plans based at least in part on the live transactional compensation data, determine a compensation model based at least in part on the set of compensation assignment plans, and provide the compensation model.

20 Claims, 11 Drawing Sheets

(56) References Cited

U.S. PATENT DOCUMENTS

| | | | | |
|---|---|---|---|---|
| 2002/0188542 | A1* | 12/2002 | Zhang | G06Q 40/06 705/36 R |
| 2007/0239468 | A1* | 10/2007 | O'Brien | G06Q 40/12 705/14.1 |
| 2008/0126153 | A1* | 5/2008 | Singhal | G06Q 40/00 705/322 |
| 2009/0259928 | A1* | 10/2009 | Lillie | G06Q 10/063 715/205 |
| 2010/0198634 | A1* | 8/2010 | Hayden | G06Q 10/10 715/810 |
| 2011/0054972 | A1* | 3/2011 | Hayden | G06Q 10/06 715/780 |
| 2012/0053952 | A1* | 3/2012 | Upadhyaya | G06Q 10/10 705/1.1 |
| 2016/0140463 | A1* | 5/2016 | Ezry | G06Q 10/0639 705/7.38 |

FOREIGN PATENT DOCUMENTS

| | | | | |
|---|---|---|---|---|
| WO | WO-0111501 A1 * | 2/2001 | | G06Q 10/10 |
| WO | WO-2011094216 A1 * | 8/2011 | | G06Q 30/0214 |

OTHER PUBLICATIONS

Sims et al.: Expatriate Compensation: An Exploratory Review of Salient Contextual Factors and Common Practices, May 2004, pp. 1-11 (Year: 2004).*

ERC: HR Insights Biogs: 3 Tips for Updating Your Compensation Program, Feb. 15, 2011, pp. 1-8. (Year: 2011).

Lisa A. Burke: "Designing A Pay Structure: Case Study and Integrated Application Exercises", 2008, Society for Human Resource Management (SHRM), pp. 1-47. (Year: 2008).

Misra et al.: "A Structural Model of Sales-Force Compensation Dynamics: Estimation and Field Implementation", Sep. 16, 2009, Research Paper No. 2037, pp. 1-56. (Year: 2009).

* cited by examiner

Compensation Scheme Information

| Compensation Factors | Compensation Plans |
|---|---|
| Job Profile – Product Engineer<br>Citizenship Status – USA<br>Compensation Grade – 3<br>Is Manager – No<br>Last Review Rating – 5 | PERF<br>SFZ2<br>VPBC<br>BASE |
| Job Profile – Financial Assistant<br>Collective Agreement – Citizens United<br>External Pay Group – Business Group<br>On Leave – Yes<br>Pay Rate Type – Hourly<br>Scheduled Hours – 40 | PERF<br>STIP<br>SZF1<br>SZF2<br>FCZ2<br>BASE |
| Job Profile – Sales Engineer<br>Gender – Male<br>Work Shift – Night<br>Time in Position – 2 months<br>Contract Reason – Temp hire<br>Unions – Active | VPBC<br>FCZ1<br>DEAR<br>BASE |

302 – Compensation Factors
304 – Compensation Plans
300

FIG. 3

Compensation Plan Information

| Plan Name (402) | Plan Description (404) | Percentage or Fixed Amount (406) | Percentage Basis (408) |
|---|---|---|---|
| PERF | Performance Bonus | $17,000 | |
| SFZ2 | Saving Fund Zone B | 12% | GRNPS1 |
| VPBC | Vacation Premium Base | 2.5% | GRBASE |
| BASE | Base Pay (Salary) | | |

Percentage Basis Information

| Percentage Basis Name (412) | Plan(s) Used as the Basis (414) |
|---|---|
| GRNPS1 | PERF VPBC |
| GRBASE | BASE |

Compensation Model

| Plan Name | Allocated Amount |
|---|---|
| PERF | $17,000 |
| SFZ2 | $2,286.44 |
| VPBC | $2,053.75 |
| BASE | $82,149.81 |

FIG. 6

Hypothetical Compensation Scenario Change Flow

COMPENSATION MODELING USING PLAN COLLECTIONS

CROSS REFERENCE TO OTHER APPLICATIONS

This application is a continuation of U.S. patent application Ser. No. 15/143,411, entitled COMPENSATION MODELING USING PLAN COLLECTIONS filed Apr. 29, 2016, which is incorporated herein by reference for all purposes.

BACKGROUND OF THE INVENTION

Large, multi-national corporations have diverse employee populations, each with a unique set of interrelated compensation components as dictated by country specific laws, union contracts, and company policies. Managing these diverse sets of compensation components and their interdependencies by a single set of company defined rules is complicated and time consuming for the Compensation Administrator. A compensation professional must define a set of rules for each compensation component, define their interdependencies, and their dependent proportions such that each individual component of an employee's compensation can be valued correctly when a total compensation amount is awarded. Due to complexity, a compensation professional typically uses a subset of applicable compensation factors and plans, resulting in inaccurate calculations that must be manually changed to fit budget requirements, and even with this the calculations are time consuming and so are not necessarily using up to date data.

BRIEF DESCRIPTION OF THE DRAWINGS

Various embodiments of the invention are disclosed in the following detailed description and the accompanying drawings.

FIG. 3 is a diagram illustrating an embodiment of compensation scheme information.

FIG. 4 is a diagram illustrating an embodiment of compensation plan information.

FIG. 6 is a diagram illustrating an embodiment of a compensation model.

DETAILED DESCRIPTION

Figure 1:
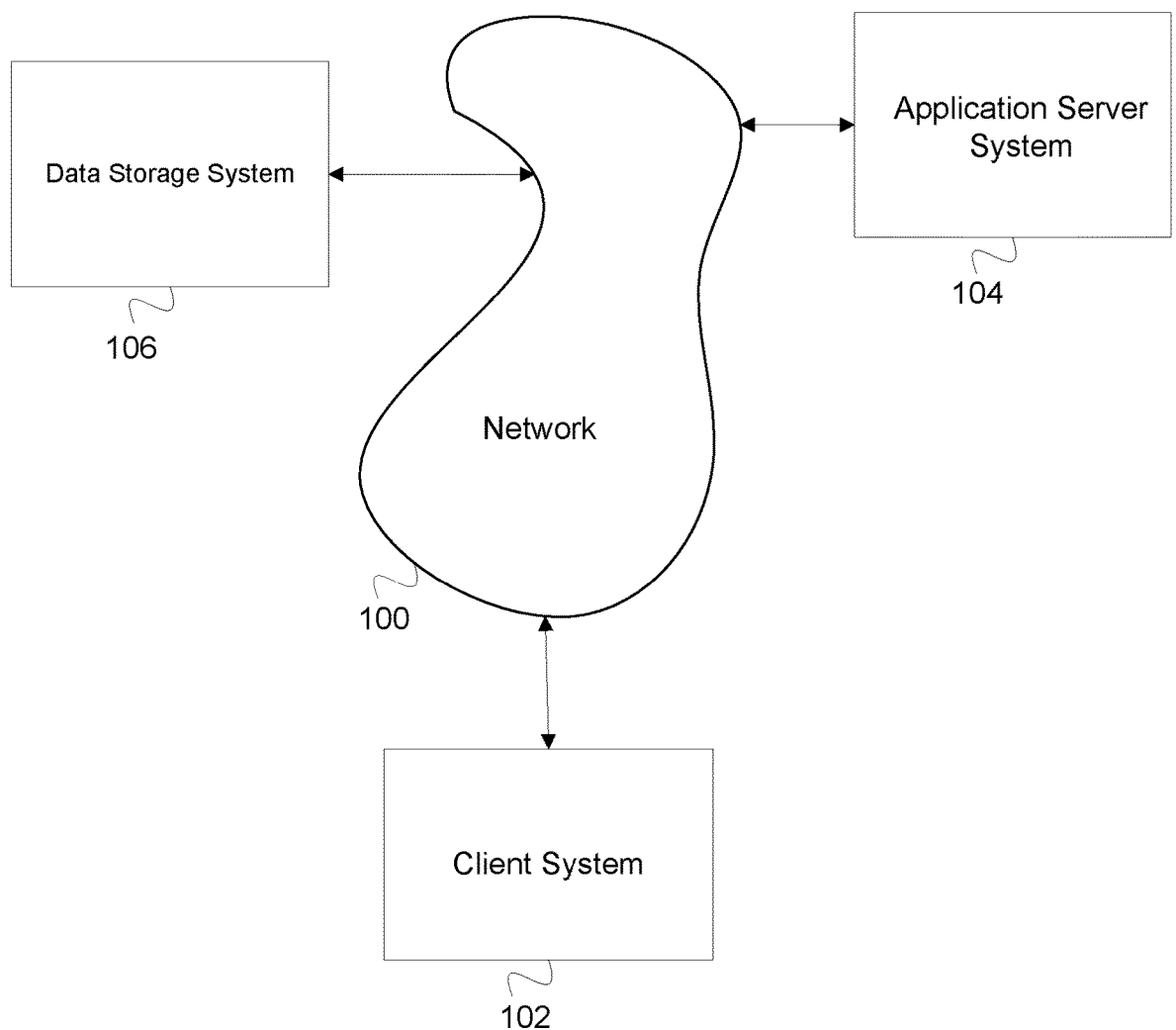
FIG. 1 is a block diagram illustrating an embodiment of a system for compensation modeling.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for compensation modeling is disclosed. The system comprises an interface to receive live transactional compensation data. The system additionally comprises a processor to determine a set of compensation assignment plans based at least in part on the live transactional compensation data, determine a compensation model based at least in part on the set of compensation assignment plans, and provide the compensation model.

In some embodiments, the system for compensation modeling is used to project or determine an employee's compensation based on live transactional compensation data. In various embodiments, the live transactional compensation data comprises a total compensation amount, job-related factors, a set of compensation plans, compensation plan guarantees, ceiling amounts, or any other appropriate compensation data. In some embodiments, an employee's total compensation is divided amongst multiple compensation plans, which in various embodiments comprises a salary base plan, a sales commission plan, a housing stipend, a yearly bonus, and any other appropriate plan. In some embodiments, a compensation plan guarantee stipulates a specific plan to have a minimum monetary value as specified by union contracts, legal requirements, obligations acquired through acquisitions, or other appropriate means. In some embodiments, guaranteed amounts represent a long-term obligation to the company that is an essential factor in budgeting and compensation allocation. In some embodiments, a ceiling amount stipulates an upper limit for an amount that can be allocated to an individual employee for a compensation plan. In some embodiments, a compensation modeling system takes into account compensation factors and compensation plans, which are continuously updated, and automatically calculates the breakdown of the employee compensation.

In some embodiments, the system for compensation modeling comprises a processor to determine a set of compensation assignment plans based at least in part on the live transactional compensation data. In some embodiments, the compensation data comprises a set of plans. In some embodiments, the live transactional compensation data comprises compensation factors. In some embodiments, the processor uses compensation information stored in a computer memory and compensation factors to determine the appropriate set of plans. In some embodiments, the compensation information comprises a description of a compensation plan or information on compensation plan interdependencies. In some embodiments, the compensation plan information comprises information on determining a compensation scheme (e.g. a group of compensation plans) based on one or more compensation factors. The processor determines a compensation model based at least in part on the set of compensation assignment plans and provides the compensation model. In some embodiments, the compensation modeling system receives a total compensation amount for each employee, works out the interdependencies of each component compensation plan, and interprets the component's rules in order to automatically assign a value to each plan, such that the sum total of the values for each component is exactly equal to the assigned total compensation value.

In some embodiments, a client of the system for compensation modeling comprises a compensation administrator, a user of the system, or any other appropriate person or entity. In some embodiments, a compensation modeling system allows a client system to access real-time compensation data in determining employee compensation. In some embodiments, a compensation modeling system allows a client system to pull a specific employee's compensation information and analyze the effect of changes, for example, a job change, on an employee's compensation. In some embodiments, a compensation modeling system saves hours of effort and provides forward looking planning capabilities that help users of a client system maximize compensation outlays. In some embodiments, the compensation modeling system determines plan behaviors and establishes the required processing order. Competing systems require that a compensation professional work out a processing order and assign a processing order number to each of potentially thousands of plans in their system. The compensation modeling system eliminates this requirement for compensation professionals, which saves many hours of effort. In addition, the compensation modeling system accurately computes a worker's salary amount from the context of a set of plan assignments. In some embodiments, the compensation modeling system accurately computes each worker's salary amount from the context of a set of plan assignments. Eliminating the need to compute and assign an individual salary amount for a worker, a set of workers, or each worker in the system is also a large time saver for the compensation professional. The compensation modeling system allows compensation administrators to quickly and accurately run a variety of hypothetical scenarios with real-time data to project the financial impact of future compensation changes to the organization. The combination of the time savings and financial planning support afforded by the system allows large complex multi-national companies to manage and optimize employees' compensation and costs with a single global model and a smaller, more centralized staff, giving these companies a competitive advantage over users of other systems.

In some embodiments, a check is routinely performed to monitor the compensation data for changes. In some embodiments, in the event the compensation data is found to be updated, the compensation model is updated based on the compensation data. In some embodiments, the compensation data is flagged upon being used in determining a compensation plan. In some embodiments, in the event a flagged compensation data is changed, a corresponding compensation model is updated. In various embodiments, a compensation model is triggered to be updated based on an updated compensation data, a revision of the compensation scheme, a revision of the compensation factors, a revision of a compensation plan, a revision of compensation plan interdependencies, or a recalculation of the compensation model (e.g. as triggered by a user).

FIG. 1 is a block diagram illustrating an embodiment of a system for compensation modeling. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Client system 102, application server system 104, and data storage system 106 communicate via network 100. In various embodiments, application server system 104 comprises a system for accessing data storage system 106 and interacting with client system 102. In some embodiments, application server system 104 comprises a compensation modeling system for providing compensation models to client system 102. In various embodiments, the network system comprises 1, 2, 5, 10, 22, 122, or any other appropriate number of client systems. Data storage system 106 comprises computer memory to store information needed for compensation modeling. In some embodiments, data storage system 106 comprises a human resources data storage system.

Figure 2:
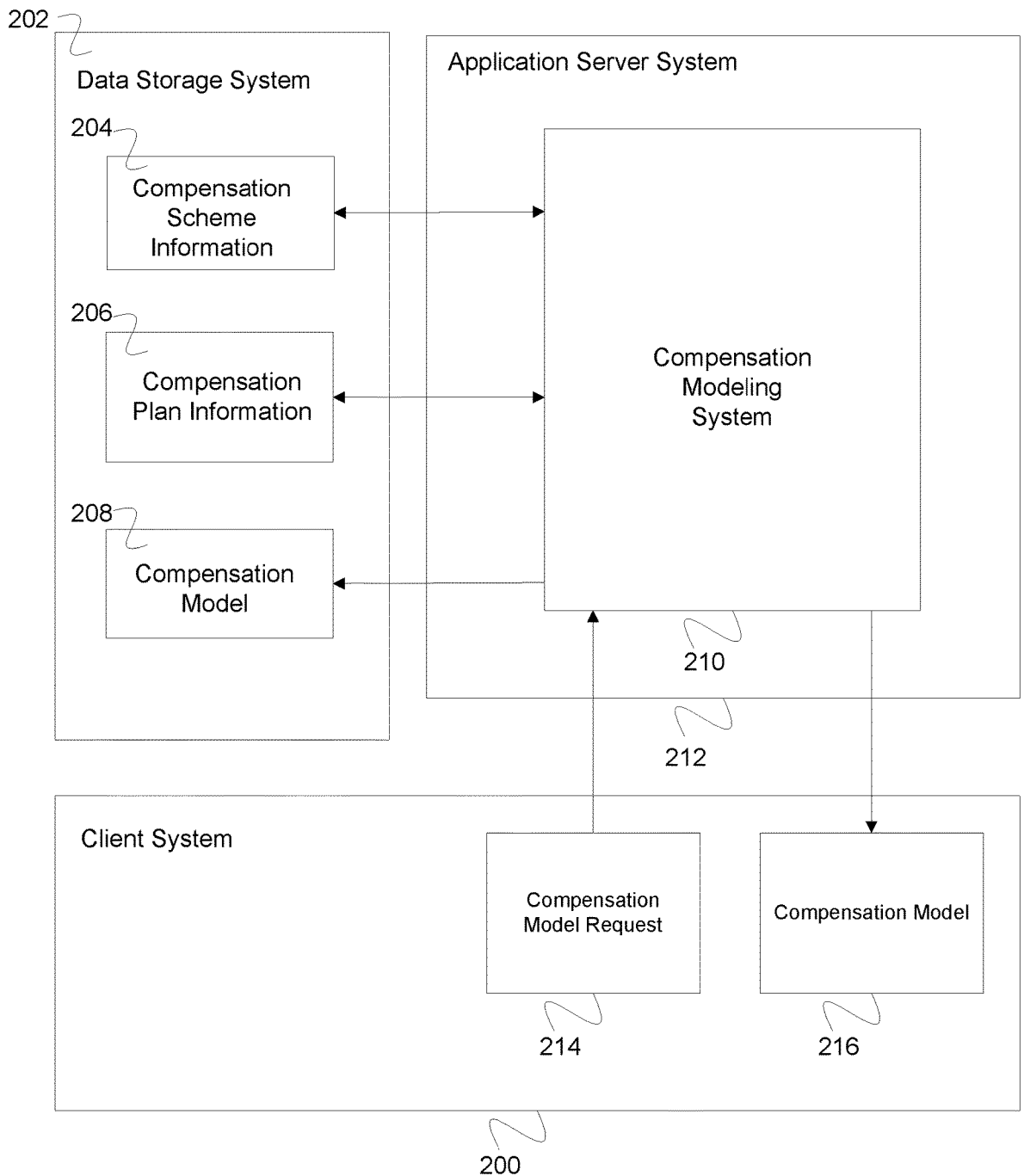
FIG. 2 is a block diagram illustrating an embodiment of a system for compensation modeling.

FIG. 2 is a block diagram illustrating an embodiment of a system for compensation modeling. In some embodiments, client system 200 is implemented by client system 102 of FIG. 1. In some embodiments, application server system 212 is implemented by application server system 104 of FIG. 1. In some embodiments, data storage system 202 is implemented by data storage system 106 of FIG. 1. In the example shown, client system 200 sends compensation model request 214 to application server system 212. In some embodiments, compensation model request 214 comprises live transactional compensation data. In some embodiments, application server system 212 implements compensation modeling system 210 to interpret compensation model request 214 and retrieve the required information for the compensation model from data storage system 202. In some embodiments, the required information in data storage system 202 comprises compensation scheme information 204, used to specify a set of compensation plans, and compensation plan information 206, used to specify plan details. In some embodiments, compensation modeling system 210 determines a compensation model based at least in part on the set of compensation assignment plans that comprise the compensation scheme associated with model request 214. In some embodiments, compensation modeling system 210 provides client system 200 with compensation model 216 based on live transactional compensation data provided by a client system in compensation model request 214. In some embodiments, compensation modeling system 210 stores compensation model 208 in data storage system 202 categorized appropriately, for example under an employee name. In some embodiments, the communication shown between blocks of the block diagram are in communication via network 100 of FIG. 1.

In some embodiments, compensation modeling system updates a compensation model (e.g., compensation model 208, compensation model 216, etc.) based at least in part on an updated input data (e.g., input data comprising data provided by the client system, data provided by data storage system, live transaction data, compensation data, compensation scheme data, compensation pan data, etc.). In some embodiments, an indication indicates that an input data to a compensation model is updated, and based on the indication, the compensation modeling system stores the updated input data, recalculates the model, stores an updated model, and provides the updated model to a client system.

FIG. 3 is a diagram illustrating an embodiment of compensation scheme information. In some embodiments, compensation scheme information 204 of FIG. 2 comprises compensation scheme information 300. In some embodiments, compensation scheme information 300 comprises live transactional compensation data. In some embodiments, the live transactional compensation data comprises sets of compensation factors, as shown in the diagram in column 302. In some embodiments, a set of compensation factors describe or identify a job role or employee position. In some embodiments, compensation scheme information 300 comprises sets of compensation plans associated with the compensation factors, as shown in the diagram in column 304.

In the example shown in FIG. 300, compensation factors "Job Profile—Product Engineer," "Citizenship Status—USA," "Compensation Grade—3," "Is Manager—No," and "Last Review Rating—5" of compensation factors column 302 are associated with compensation plans "PERF," "SFZ2," "VPBC," and "BASE" of compensation plans column 304. Compensation factors "Job Profile—Financial Assistant," "Collective Agreement—Citizens United," "External Pay Group—Business Group," "On Leave—Yes," "Pay Rate Type—Hourly," and "Scheduled Hours—40" of compensation factors column 302 are associated with compensation plans "PERF," "STIP," "SZF1," "SFZ2," "FCZ2," and "BASE" of compensation plans column 304. Compensation factors "Job Profile—Sales Engineer," "Gender—Male," "Work Shift—Night," "Time in Position—2 months," "Contract Reason—Temp hire," and "Unions—Active" of compensation factors column 302 are associated with compensation plans "VPBC," "FCZ1," "DEAR," and "BASE" of compensation plans column 304.

In some embodiments, an appropriate set of compensation plans to use in a compensation model is determined by a compensation modeling system by searching for the set of compensation plans associated with a given set of compensation factors. In some embodiments, a compensation scheme comprises 5, 27, 93, or any appropriate number of compensation plans. In some embodiments, a collection of compensation plans or compensation scheme is determined by multiple job-related compensation factors. In various embodiments, a collection of compensation plans or compensation scheme is determined by 3, 25, 80, 140, or any appropriate number of compensation factors. In some embodiments, the compensation factors are continuously updated by an outside server to maintain accuracy. The table below describes compensation factors used in various embodiments:

| Compensation Factor | Description |
| --- | --- |
| Age | Returns the Age of a Worker in years. |
| Benefit Group | Contains the Benefit Group for the Worker. |
| Blended FTE | Returns the Blended FTE for a Worker's Primary Job. |
| Citizenship Status | The legal status of the Worker. |
| Collective Agreement | The collective agreement(s) of the employee's contract. |
| Collective Agreement Area | The Collective Agreement Area for the Compensation Event. |
| Collective Agreement Coefficient | The Collective Agreement Coefficient for the Compensation Event. |
| Collective Agreement Group | The Collective Agreement Group for the Compensation Event. |
| Collective Agreement Level | The Collective Agreement Level for the Compensation Event. |
| Collective Agreement Position | The Collective Agreement Position for the Compensation Event. |
| Collective Agreement Position for Worker | The Collective Agreement Position for the Compensation Event. |
| Collective Agreement Professional Category | The Collective Agreement Professional Category for the Compensation Event. |
| Collective Agreement Step | The Collective Agreement Step for the Compensation Event. |
| Company | The company for the Worker. |
| Compensation Grade | Returns the applicable compensation grade. |
| Compensation Grade Hierarchy | Current Compensation Hierarchy Name and Rank for Worker. |
| Compensation Grade Hierarchy Rank | Current Compensation Hierarchy Rank value for Worker. |
| Compensation Grade Profile | Returns the applicable compensation grade profile. |
| Compensation Plans | Contains the compensation plans assigned to an employee. |
| Compensation Step | Returns the applicable compensation step. |
| Continuous Service Date | Employee service date taking into account breaks in service. |
| Contract Reason | The reason(s) of the employee contract. |
| Cost Center | Returns the applicable cost center. |
| Country of Location | Returns the country location. |
| Country of Location Current Otherwise Last Known Location | The country of the location for the Worker otherwise the last known country of the location for the terminated Worker. |
| Custom Organizations | The custom organizations for the Worker. |
| External Pay Group | The external pay group for the Worker. |
| FTE % | The full time equivalent percentage for the Worker. |
| Gender | The gender of the Worker. |
| Hire Date | Returns the applicable hire date. |
| Is International Assignee | Returns true if a Worker is on a current international assignment. |
| Is Manager | Returns true if the Worker has a Manager Role. |
| Job Category | The job category for the Worker. |
| Job Classifications | The complete set of job classifications proposed for the position, and job classifications associated with the job profile. |

-continued

| Compensation Factor | Description |
| --- | --- |
| Job Code | Returns the applicable job code. |
| Job Exempt | The exempt flag for the Worker as of the effective date. This report field will only work for a Worker and does not work with unfilled positions (i.e. it cannot be used in a compensation rule associated with default compensation). |
| Job Family and Job Family Group | Returns the applicable job family and job family group. |
| Job Level | Returns the applicable job level. |
| Job Profile | Returns the applicable job profile. |
| Last Review Rating | The overall rating for the last completed employee review. The overall rating comes from the overall section in the manager's evaluation. |
| Length of Service in Months from Continuous Service Date | The number of months of service for the Worker, taking into account breaks in service. |
| Length of Service in Partial Years | The years of service for the Worker including a partial year represented in 2 decimals. |
| Length of Service in Years | The years of service for the Worker. |
| Location | Returns the applicable location. |
| Location Hierarchy | The location hierarchy for the Worker based on the location of the Worker. For job application, the location hierarchy is based on the location's hiring requirement of the Job Requisition. |
| Management Level | Returns the applicable management level. |
| Nationality | Contains the primary country of which the Worker is a national. |
| On Leave | Returns true if the employee is on leave. |
| Organization Hierarchies | The organization hierarchies for the new organizations assigned to the Worker as of the effective date. |
| Organization and Superior Organizations | The organization and superior organizations for the position. |
| Organizations | Contains all the organizations (e.g. supervisory, cost center, region, etc) for the position, headcount group, or hiring restrictions. |
| Pay Group | The proposed pay group for the Worker if available, else current pay group. |
| Pay Rate Type | The pay rate type for the Worker. |
| Position | Returns the applicable position. |
| Primary Address-Country | The country from the worker's primary home address. |
| Primary Termination Reason | The primary reason for termination. |
| Rating-Current Performance Review | The overall rating for the last completed performance review. The overall rating comes from the overall section in the manager's evaluation. |
| Scheduled Hours | Returns the applicable scheduled hours. |
| Secondary Termination Reasons | The secondary reasons for the termination. |
| State of Location | Returns the applicable state location. |
| Supervisory Organization | The supervisory organization for the position. |
| Termination Date | The effective date of the worker's termination |
| Termination Date Recent or Future | The effective date of the worker's recent or future termination. |
| Termination Reason | The reason for termination. |
| Termination Reason Recent or Future | The reason for recent or future termination. |
| Time Type | Returns the applicable time type. For example, full time or part time. |
| Time in Position | The length of time the Worker has been in the position. |
| Unions-Active | Contains the Unions that the Worker is currently Active in. |
| Unions-Active and Paid Dues | Contains the Unions that the Worker is Active in and is Paying Dues in. |
| Unions-All | Contains all Unions that the Worker is associated with, regardless of membership status. |
| Unions-Paid Dues | Contains the Unions in which the Worker is currently paying dues. |
| Work Address-Country | The country from the work address for the Worker. If the work address is blank, then uses the country of the primary address from the worker's location. |
| Work Shift | Returns the applicable work shift. |
| Employee Contract Reason | The reason(s) of the employee contract. |
| Employee ID | The Employee ID for the Worker. |
| Employee/Contingent Worker Type | Returns the applicable Worker sub-type. |
| Worker | Identifies the Worker. |
| Worker Active | Returns true if Worker is active. |
| Worker Certifications | Contains the certifications that a Worker has been issued. |
| Worker Event | Returns a Worker Event for certain Compensation Rule Targetable subclasses: For Position, returns the latest Staffing Event on or before the Processing Moment For Position Group return the most recent Position Group Event on or before the Processing Moment For Staffing Event and Position Group Event, returns itself. |
| Worker is Employee | Returns true if Worker is an employee. |

FIG. 4 is a diagram illustrating an embodiment of compensation plan information. In various embodiments, compensation plan information is stored as data objects with attributes, as a hash table, or in any other appropriate form. In some embodiments, compensation plan information 400 comprises information for all possible compensation plans used in a compensation scheme—for example, used as a basis for a compensation model. In some embodiments, compensation plan information 206 of FIG. 2 comprises compensation plan information 400. In some embodiments, compensation plan information 400 comprises live transactional compensation data. In some embodiments, compensation plans are continuously updated to reflect ongoing negotiations or time-sensitive contracts. In some embodiments, compensation plan information 400 comprises an associated plan description, percentage or fixed amount, and/or percentage basis for a given plan name stored in the plan information. Column 402 of the data table shown in FIG. 4 comprises names of plans detailed in compensation plan information 400. Column 404 comprises descriptions of the plans. Column 406 comprises percentages and fixed amounts.

In FIG. 4, plan name "PERF" is associated with plan description "Performance Bonus" with a fixed amount of $17,000. Plan name "SFZ2" is associated with plan description "Saving Fund Zone B," a percentage of 12%, and a percentage basis of "GRNPS1." Plan name "VPBC" is associated with plan description "Vacation Premium Base," a percentage of 2.5%, and a percentage basis of "GRBASE." Plan name "BASE" is associated with a plan description of "Base Pay (Salary)."

In some embodiments, a set of compensation plans used to determine a compensation model comprises a fixed amount plan, wherein a plan has an associated fixed monetary amount. In some embodiments, a set of compensation plans comprises a percentage-based plan, wherein a plan has a monetary amount that is a percentage of a percentage basis. In various embodiments, a percentage basis is another plan or multiple plans of the compensation scheme. In some embodiments, for a compensation scheme comprising a percentage-based plan, a first plan of a set of compensation assignment plans comprises a dependency on a second plan or multiple plans in the set of compensation assignment plans. Column 408 comprises percentage bases for percentage-based plans.

In some embodiments, compensation plan information 400 comprises percentage basis information 410. In some embodiments, percentage basis information 410 comprises a percentage basis name and a set of associated plans used as the basis for the percentage basis name. Column 412 comprises percentage basis names and column 414 comprises associated sets of plans used as the basis.

In FIG. 4, percentage basis name "GRNPS1" is associated with plans "PERF" and "VPBC" used as the basis. Percentage basis plan "GRBASE" is associated with plan "BASE" used as the basis.

In some embodiments, the plan or multiple plans in the sets of plans used as bases must appear in the compensation scheme. In some embodiments, a plan included in the compensation scheme and has a dependency on another plan must be dependent only on plans that are also included in the compensation scheme. In some embodiments, a set of compensation plans used as the basis of a percentage-based plan comprises an unlimited number of plans. In some embodiments, a compensation scheme comprises an unlimited number of interdependent compensation plans. In some embodiments, compensation modeling system 210 of FIG. 2 searches compensation plan information 400 based on plan name for plan information on plans included in the compensation scheme.

In some embodiments, compensation plan information 400 comprises information on a base pay plan that has an undetermined amount and is not a percentage of any other plan. In some embodiments, the base pay plan monetary amount is determined by the compensation modeling system based on the compensation scheme and corresponding compensation plan information. In the example shown, plan "SFZ2" is shown to be 12% of "GRNPS1." Percentage basis name "GRNPS1" refers to a set of plans "PERF" and "VPBC." In some embodiments, the monetary amount of "SFZ2" is 12% of the monetary amount of the sum of "PERF" and "VPBC." In some embodiments, an additional field is included in compensation plan information 400, allowing the percentage to be taken from the difference of the total compensation amount and the sum of the monetary amounts of plans included in the percentage basis. For example, in a subtraction case, the monetary amount of "SFZ2" is 12% of the total compensation amount after subtracting the sum of "PERF" and "VPBC."

In some embodiments, a compensation plan is classified as a specific type of plan. The table below describes various embodiments of compensation plan types.

| Compensation Plan Type | Description |
| --- | --- |
| Salary Plan | Defines basic payments. There are three variants: Salary by Amount, Salary by Units Worked (e.g. piece work rates) and Hourly. |
| Period Salary Plan | A salary amount that is defined as a time based proportion of the employee's salary. For example, 1 month's salary would mean the employee gets one additional month's worth of salary. |
| Allowance Plan | Defines additional amounts that can be paid to an employee. There are three variants: Amount, Percent and Unit based plans. Amount is a fixed amount. The amount for a percent plan is calculated as a percentage of a specified compensation basis. Unit based plans are based on a number of units achieved by an employee. There is a specialized type of plan called a reimbursement allowance which is used to reimburse employees for authorized expenses, for example: college tuition fees. |
| Bonus Plan | Defines the amount an employee is likely to be given were they to hit their goals and targets. There are 2 variants: Amount and Percent based. The amount for a percent plan is calculated as a percentage of a specified compensation basis. |
| Stock Plan | Defines the stock an employee is likely to be granted were they to hit their goals and targets. There are 3 variants: Amount, Percent and Unit based. Amount represents an amount that will be converted to actual stock units when the strike price is known. Similarly percent plans represent a percentage of a specified compensation basis which is converted to an amount and ultimately to actual stock units. Unit based plans specify the number of shares the employee will be granted. You can also specify different types of long term incentive (e.g. options, RSUs, long term cash, etc.). |

-continued

| Compensation Plan Type | Description |
|---|---|
| Commission Plan | Used in sales situations to reward employees with amounts based on sales achieved. |
| Calculated Plan | A specialized plan where a customer can define custom calculations to determine the amount an employee is paid based on that plan. |
| Retirement Savings Plan | Defines the amount of money being paid into a retirement savings plan by the employee and employer. |
| Future Payment Plan | A specialized plan for employees who are paid bonuses over a term period. |

Figure 5A:
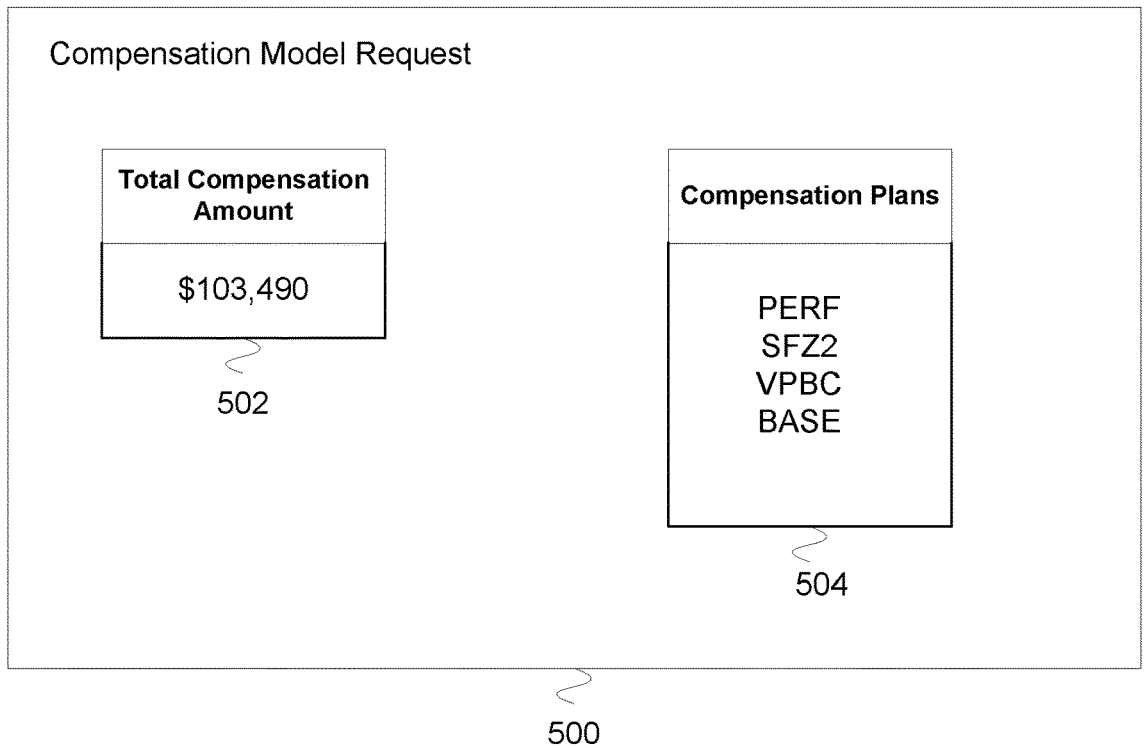
FIG. 5A is a diagram illustrating an embodiment of a compensation model request.

FIG. 5A is a diagram illustrating an embodiment of a compensation model request. In some embodiments, compensation model request 214 of FIG. 2 comprises compensation model request 500. In the example shown, compensation model request 500 comprises total compensation amount 502. Compensation model request 500 comprises set of compensation plans 504. In the figure, total compensation amount 502 is $103,490 and compensation plans 504 comprise plans "PERF," "SFZ2," "VPBC," and "BASE." In some embodiments, a compensation modeling system determines a compensation model based at least in part on set of compensation plans 504 provided by a client system in compensation model request 500. In some embodiments, total compensation amount 502 is used to calculate the appropriate monetary amounts of plans listed in compensation plans 504. In some embodiments, a provided collection of compensation plans 504 in compensation model request 500 eliminates the need for a modeling system to retrieve compensation scheme information 204 of FIG. 2. In some embodiments, a provided collection of compensation plans 504 provides compensation scheme information. In some embodiments, live transactional data provided by a client system comprises set of compensation plans 504.

Figure 5B:
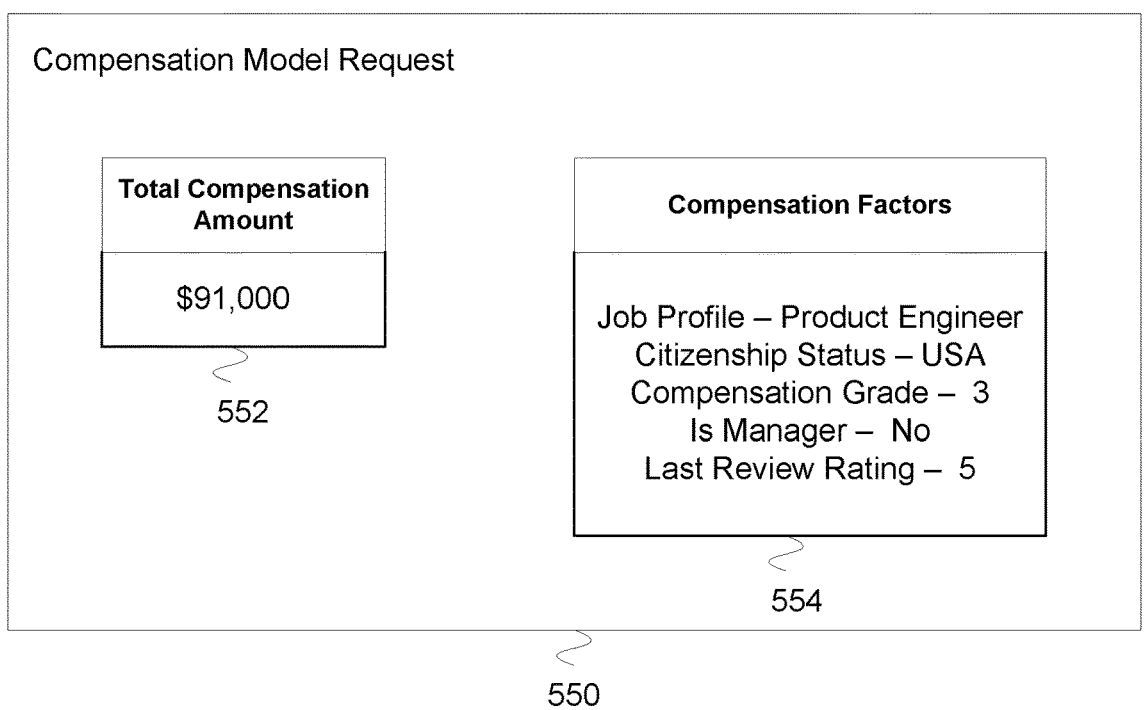
FIG. 5B is a diagram illustrating an embodiment of a compensation model request.

FIG. 5B is a diagram illustrating an embodiment of a compensation model request. In some embodiments, compensation model request 214 of FIG. 2 comprises compensation model request 550. In the example shown, compensation model request 550 comprises total compensation amount 552, shown to be $91,000. Compensation model request 550 comprises set of compensation factors 554, shown to be "Job Profile—Product Engineer," "Citizenship Status—USA," "Compensation Grade—3," "Is Manager—No," and "Last Review Rating—5". In some embodiments, a compensation modeling system searches compensation scheme information 300 of FIG. 3 to find an associated collection of compensation plans for set of compensation factors 554 provided. In some embodiments, total compensation amount 552 is used to calculate the appropriate monetary amounts of plans determined based on set of compensation factors 554. In some embodiments, live transactional data provided by a client system comprises set of compensation factors 554.

In some embodiments, compensation model request 500 or compensation model request 550 comprise a maximum or minimum plan value. For example, any plan in the compensation scheme determined for the compensation model may not exceed a given maximum monetary value or fall below a given minimum monetary value. In some embodiments, compensation model request 500 comprises a maximum value or minimum value for a given plan in set of plans 504. For example, compensation model request 500 specifies plan "VPBC" has a maximum value of $9000 and plan "SFZ2" has a minimum value of $500. In some embodiments, a modeling system considers maximum and minimum values specified in a model request in determining a compensation model.

FIG. 6 is a diagram illustrating an embodiment of a compensation model. In some embodiments, compensation model 216 of FIG. 2 comprises compensation model request 500. In the example shown, compensation model 600 comprises a plan name and an allocated monetary amount associated with the plan. Column 602 comprises plan names and column 604 comprises associated allocated amounts. In figure shown, plan name "PERF" is associated with an allocated amount of $17,000. Plan name "SFZ2" is associated with an allocated amount of $2,286.44. Plan name "VPBC" is associated with an allocated amount of $2,053.75. Plan name "BASE" is associated with an allocated amount of $82,149.81. In some embodiments, a compensation modeling system determines compensation model 600 based on a client compensation model request and compensation information stored in a data storage system. In various embodiments, compensation information comprises a mapping of compensation factors to a compensation scheme, a description of a compensation plan, or any other appropriate information.

Figure 7:
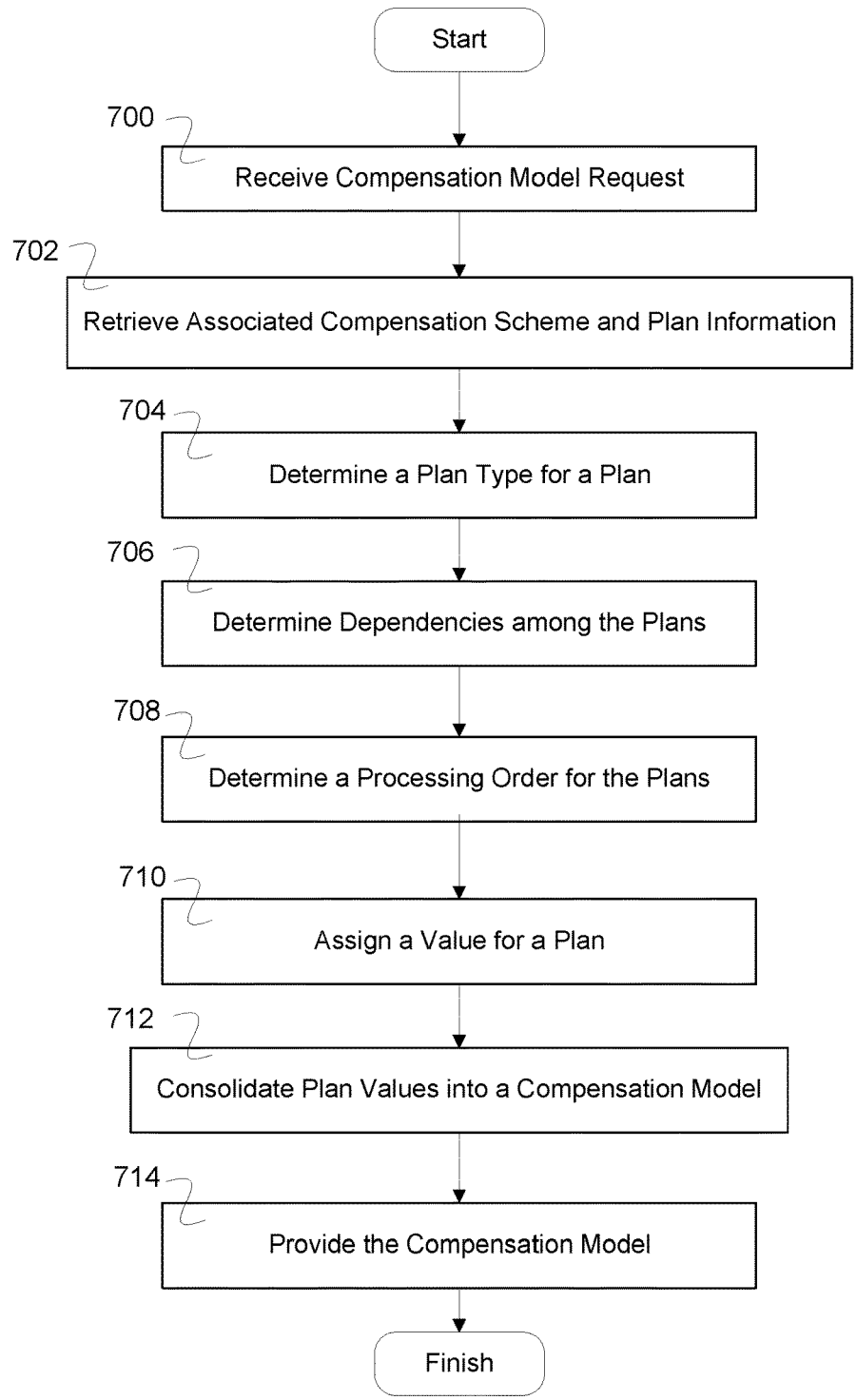
FIG. 7 is a flow diagram illustrating an embodiment of a process for compensation modeling.

FIG. 7 is a flow diagram illustrating an embodiment of a process for compensation modeling from the perspective of a compensation modeling system. In the example shown, in 700 a compensation modeling system receives a compensation model request. For example, a compensation modeling system receives a compensation model request including a total compensation amount and compensation plans or factors (e.g., compensation model request 500 or compensation model request 550 of FIG. 5). In 702, the compensation modeling system retrieves associated compensation scheme and plan information. In some embodiments, the associated information is stored in data storage system 202 of FIG. 2. In some embodiments, a compensation model request provides live transactional compensation data comprising a set of compensation assignment plans. In some embodiments, a compensation model request provides live transactional compensation data comprising a set of compensation factors and the data modeling system determines the appropriate set of compensation plans based on the factors and compensation scheme information. In 704, a plan type is determined for a plan. For example, a compensation modeling system determines a plan type for a plan or each plan in the set of compensation assignment plans. In some embodiments, the set of compensation plans comprises a fixed amount plan or a percentage-based plan. In 706, dependencies among the plans are determined. For example, the compensation modeling system determines dependencies within the set of compensation assignment plans. In some embodiments, a first plan in the set of compensation assignment plans comprises a dependency on a second plan or multiple plans in the set of compensation assignment plans. In 708, a processing order is determined for the plans. For example, the compensation modeling system determines a processing order for the set of plans. In some embodiments, the processing order is determined based at least in part on plan type. In some embodiments, the processing order for the set of compensation assignment plans is based at least in part on plan dependencies. In various embodiments, a compensation modeling system groups plans by currency, frequency (e.g., monthly, annual, etc.), percentage or fixed amount plan, percentage basis, or any other appropriate plan type. For example, fixed amount plans are first in the processing order, followed by plans with dependencies on fixed amount plans only, and followed by plans depending on dependent plans. In some embodiments, the compensation modeling system allows the model to be created efficiently without the need of a user-entered (e.g., entered by a user using a client system) grouping ordering code. In 710, a value is assigned for a plan. For example, the compensation modeling system assigns a value for a plan or each plan in the set of compensation plans. In various embodiments, the determination of the compensation model comprises assigning a value to a plan, a set of plans, or each plan in the set of compensation plans according to the processing order. In 712, plan values are consolidated into a compensation model. For example, the compensation modeling system consolidates the assigned plan values into a compensation model. In various embodiments, the compensation model comprises information on a collection of compensation assignment plans and a monetary value for a plan, a set of plans, or each plan. The sum of the monetary values of the plans is the total compensation amount. In some embodiments, the compensation model is based at least in part on a total compensation value provided in a model request. In some embodiments, the compensation model is based at least in part on one or more maximum values or minimum values set for plan(s) in the set of compensation assignment plans. In 714, the compensation modeling system provides the compensation model. In some embodiments, compensation model 216 of FIG. 2 is provided to a client system. In some embodiments, compensation model 208 of FIG. 2 is stored in a computer memory.

Figure 8:
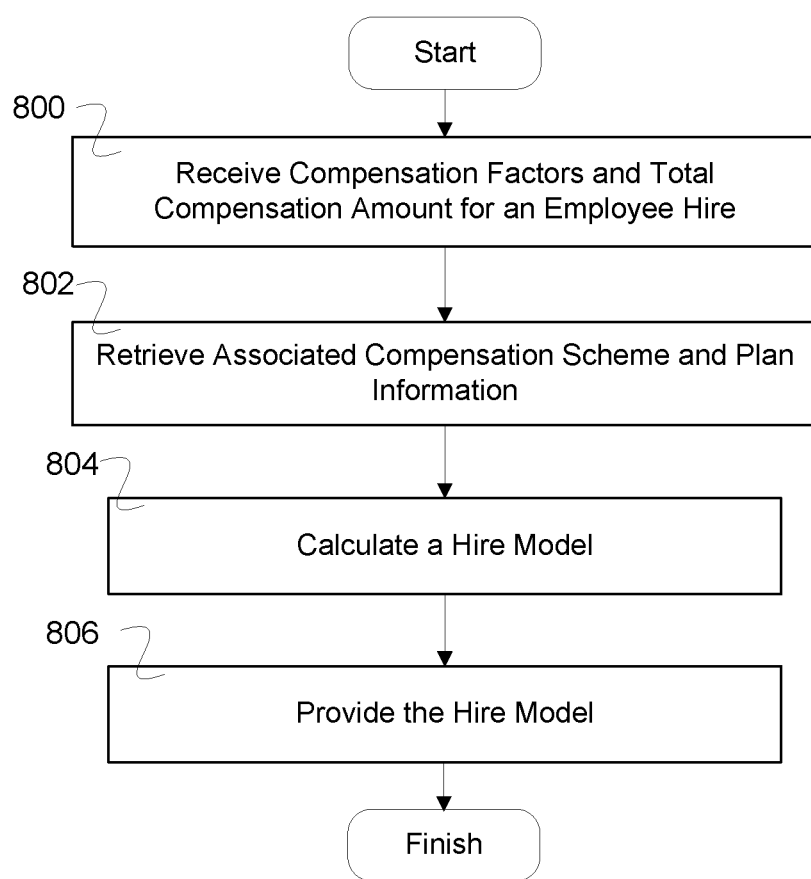
FIG. 8 is a flow diagram illustrating an embodiment of a process for modeling an employee hire.

FIG. 8 is a flow diagram illustrating an embodiment of a process for modeling an employee hire. In some embodiments, a compensation modeling system models an employee hire. In the example shown, in 800 compensation factors and total compensation amount are received for an employee hire. For example, a client system provides compensation factors and a total compensation amount for an employee hire. In some embodiments, a client system provides live transactional compensation data which comprises the factors and amount. In 802, associated compensation scheme and plan information are received. For example, the compensation modeling system retrieves associated compensation scheme and plan information. In some embodiments, the information comprises compensation scheme information 204 and compensation plan information 206 of FIG. 2. In some embodiments, a compensation scheme is not required as the client system provides a compensation scheme. In 804, a hire model is calculated. For example, the compensation modeling system calculates a hire model based on the provided and retrieved information, which in some embodiments comprises real-time, changing data. In 806, the hire model is provided. For example, the compensation modeling system provides the hire model to the client system, listing out the compensation plans and associated monetary amounts. In some embodiments, the hire model is further stored in a memory location associated with an employee name so that the employee's compensation information is easily accessed.

Figure 9:
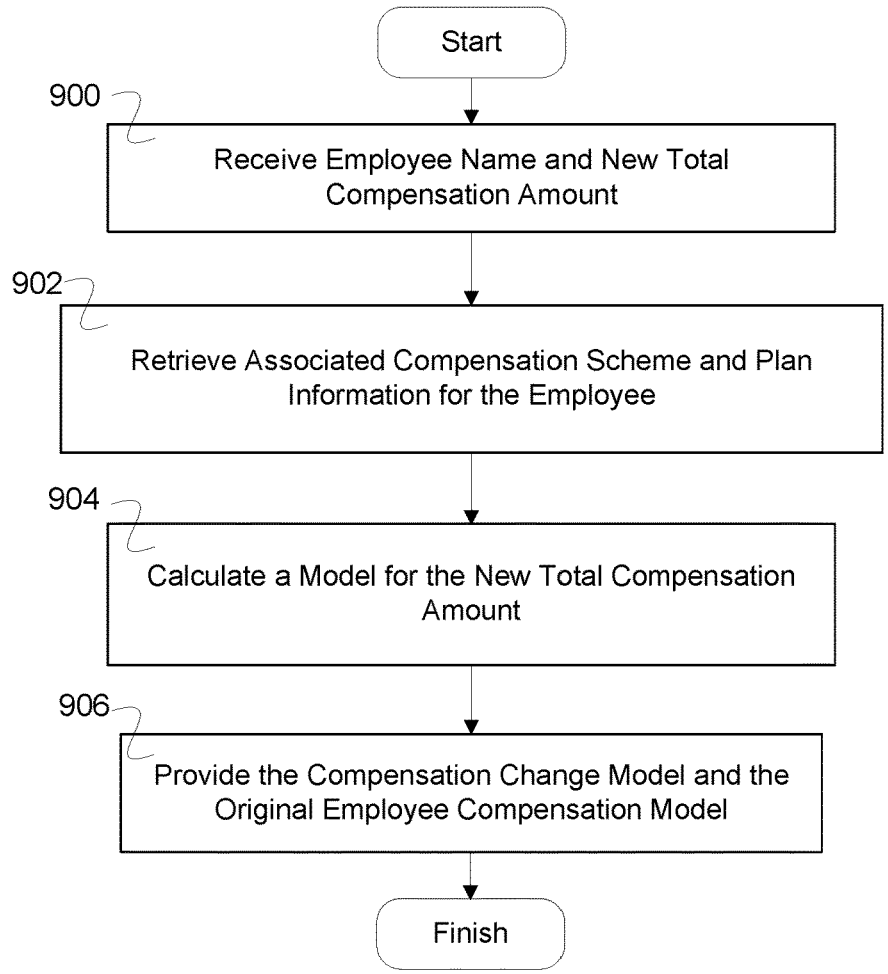
FIG. 9 is a flow diagram illustrating an embodiment of a process for modeling an employee total compensation change.

FIG. 9 is a flow diagram illustrating an embodiment of a process for modeling an employee total compensation change. In some embodiments, a compensation modeling system models an employee total compensation change. In the example shown, in 900 employee name and new total compensation amount is received. For example, a user provides an employee name and a total compensation amount to a client system. In 902, the compensation modeling system retrieves associated compensation scheme and plan information. In some embodiments, the compensation system retrieves a compensation scheme based on the employee's name. In some embodiments, the compensation plan information is continuously updated to reflect ongoing negotiations and contracts. In some embodiments, the original employee compensation model information and plan information comprises compensation model 208 and compensation plan information 206 of FIG. 2. In 904, a model for the new total compensation amount is calculated. For example, the compensation modeling system calculates a model based on the new provided total compensation amount. In 906, the compensation change model and the original employee compensation model are provided. For example, the compensation modeling system provides the compensation change model and the original employee compensation model to the client system, listing out the compensation plans and associated monetary amounts in both models. A user of the client system is able to compare the two models side by side and analyze how compensation plan allocations vary after the total compensation change.

Figure 10:
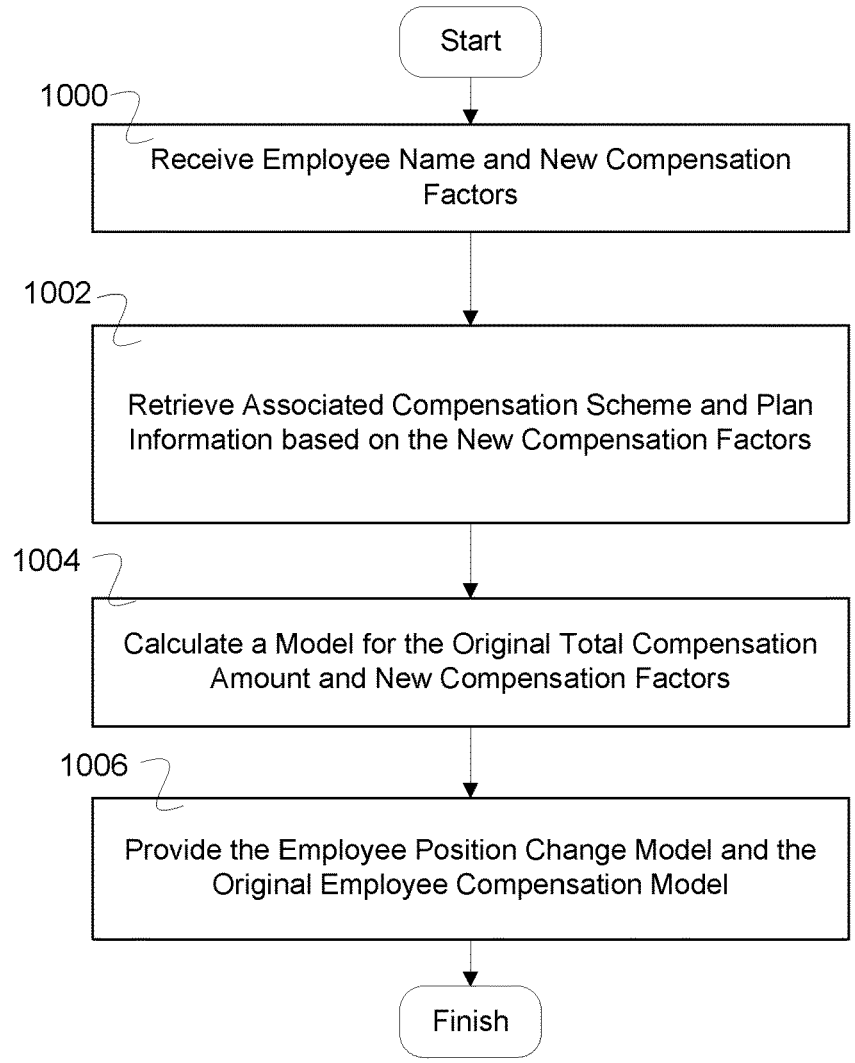
FIG. 10 is a flow diagram illustrating an embodiment of a process for modeling an employee position change.

FIG. 10 is a flow diagram illustrating an embodiment of a process for modeling an employee position change. In some embodiments, a compensation modeling system models an employee position change. In the example shown in 1000, an employee name and compensation factors are received. In some embodiments, a client system receives live transactional data comprising compensation factors or a collection of compensation plans. In 1002, the compensation modeling system retrieves associated compensation scheme and plan information. In some embodiments, the information comprises compensation scheme information 204 and compensation plan information 206 of FIG. 2. In some embodiments, a compensation scheme is not required as the client system provides a compensation scheme. In 1004, the compensation modeling system calculates a model for the employee total compensation amount and new compensation factors. In some embodiments, the model is based on the provided and retrieved information, which in some embodiments comprises real-time, changing data. In some embodiments, the compensation modeling system retrieves the total compensation amount for the employee that is stored in computer memory based on the employee name. In 1006, the compensation modeling system provides the employee position change model and the original employee compensation model to the client, listing out the compensation plans and associated monetary amounts based on the compensation factors and total compensation amount. In some embodiments, the client system is provided the compensation plans and associated monetary amounts in both models. A user of the client system is able to compare the two models side by side and analyze how compensation plans and plan allocations vary after the employee position change.

Figure 11:
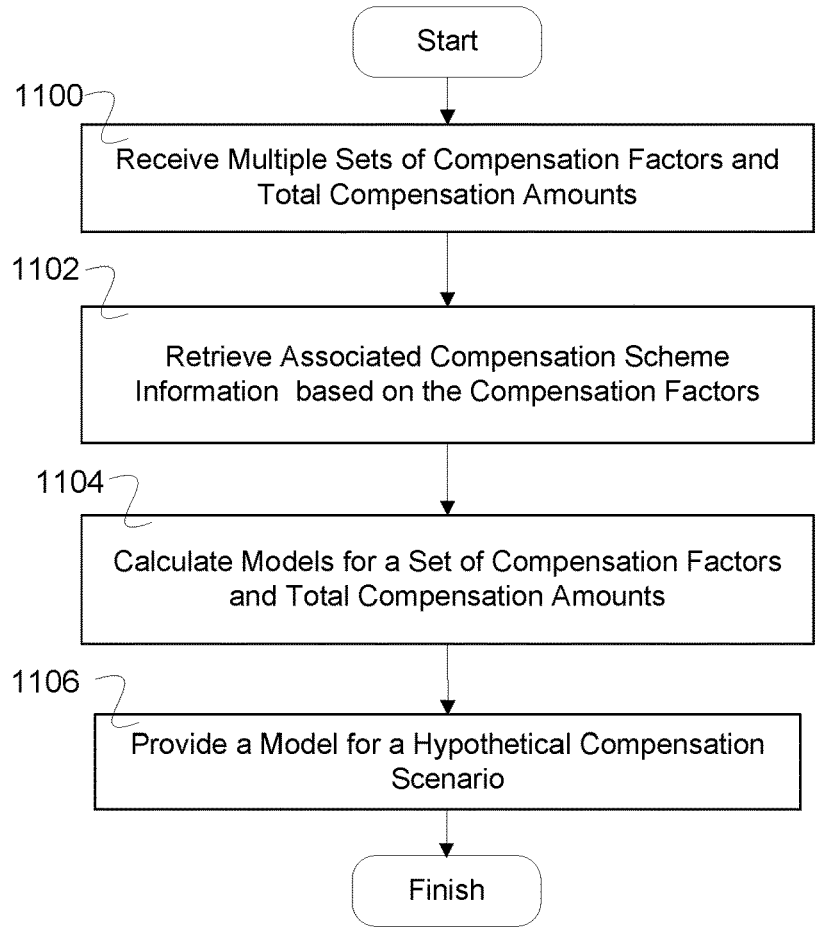
FIG. 11 is a flow diagram illustrating an embodiment of a process for modeling a hypothetical compensation scenario change.

FIG. 11 is a flow diagram illustrating an embodiment of a process for modeling a hypothetical compensation scenario change. In some embodiments, a compensation modeling system models a change between multiple hypothetical compensation scenarios. In the example shown in 1100, multiple sets of compensation factors and total compensation amounts. In some embodiments, a client provides live transactional data comprising compensation factors or a collection of compensation plans. In 1102, the compensation modeling system retrieves associated compensation scheme and plan information. In some embodiments, the information comprises compensation scheme information 204 and compensation plan information 206 of FIG. 2. In some embodiments, a compensation scheme is not required as the client provides a compensation scheme. In 1104, the compensation modeling system calculates models for a set of total compensation amounts and new compensation factors. In various embodiments, the set of total compensation amounts comprises one set, multiple sets, each set, or any other appropriate number of sets of total compensation amounts. In some embodiments, the model is based on the provided and retrieved information, which in some embodiments comprises real-time, changing data. In 1106, the compensation modeling system provides a model for a hypothetical compensation scenario, listing out the compensation plans and associated monetary amounts based on the compensation factors and total compensation amounts provided. In various embodiments, the client system is provided a model for a hypothetical compensation scenario, a set of hypothetical compensation scenario, each hypothetical compensation scenario, or any other appropriate number of scenario. A user of the client system is able to compare multiple models side by side and analyze how compensation plans and plan allocations vary. A client is able to use the information in budgeting, negotiations, and other processes vital to a business operation.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for compensation modeling, comprising:
    an interface to:
       receive live transactional compensation data, wherein the live transactional compensation data comprises a plurality of compensation factors associated with an employee; and
    a processor to:
       determine, for the employee, an appropriate set of compensation assignment plans from a set of compensation plans based at least in part on the plurality of compensation factors associated with the employee;
       determine a compensation scheme corresponding to the employee based at least in part on the appropriate set of compensation assignment plans;
       provide a compensation model that is based on the compensation scheme, wherein the compensation model is based on a first compensation factor of the plurality of compensation factors, wherein the compensation model corresponding to the employee is configured to output a total compensation amount that is based on corresponding amounts associated with each of the compensation assignment plans included in the appropriate set of compensation assignment plans;
       monitor the live transactional compensation data for one or more changes;
       determine that the first compensation factor that is based on the live transactional compensation data has changed; and
       in response to the determination that the first compensation factor that is based on the live transactional compensation data has changed, flag and update the compensation model.

2. The system of claim 1, wherein the set of compensation plans comprises a fixed amount plan.

3. The system of claim 1, wherein the set of compensation assignment plans comprises a percentage-based plan.

4. The system of claim 1, wherein a first plan in the set of compensation plans comprises a dependency on a second plan in the set of compensation plans.

5. The system of claim 1, wherein the processor is further to determine a plan type for a plan in the appropriate set of compensation assignment plans.

6. The system of claim 5, wherein the processor is further to determine a processing order for the appropriate set of compensation assignment plans based at least in part on the plan type.

7. The system of claim 5, wherein the processor is further to determine a processing order for the appropriate set of compensation assignment plans based at least in part on plan dependencies.

8. The system of claim 1, wherein the processor is further to determine dependencies within the appropriate set of compensation assignment plans.

9. The system of claim 1, wherein the processor is further to determine a processing order for the set of compensation assignment plans.

10. The system of claim 9, wherein to determine the compensation scheme, the processor is configured to assign a value to a plan based at least in part on the processing order.

11. The system of claim 1, wherein the compensation scheme of the compensation model is based at least in part on a total compensation value.

12. The system of claim 1, wherein the compensation model is configured to model an employee hire.

13. The system of claim 1, wherein the compensation model is configured to model an employee total compensation change.

14. The system of claim 1, wherein the compensation model is configured to model an employee position change.

15. The system of claim 1, wherein the compensation model is configured to model a change between multiple hypothetical compensation scenarios.

16. A method, comprising:
    receiving live transactional compensation data, wherein the live transactional compensation data comprises a plurality of compensation factors associated with an employee;
    determining, for the employee, an appropriate set of compensation assignment plans from a set of compensation plans based at least in part on the plurality of compensation factors associated with the employee;
    determining a compensation scheme corresponding to the employee based at least in part on the appropriate set of compensation assignment plans;
    providing a compensation model that is based on the compensation scheme, wherein the compensation model is based on a first compensation factor of the plurality of compensation factors, wherein the compensation model corresponding to the employee is configured to output a total compensation amount that is based on corresponding amounts associated with each of the compensation assignment plans included in the appropriate set of compensation assignment plans;

monitoring the live transactional compensation data for one or more changes;

determining that the first compensation factor that is based on the live transactional compensation data has changed; and in response to determining that the first compensation factor that is based on the live transactional compensation data has changed, flagging and updating the compensation model.

17. The method of claim 16, wherein the set of compensation assignment plans comprises a fixed amount plan.

18. The method of claim 16, wherein the set of compensation assignment plans comprises a percentage-based plan.

19. The method of claim 16, wherein a first plan in the set of compensation assignment plans comprises a dependency on a second plan in the set of compensation assignment plans.

20. A computer program product embodied in a non-transitory computer readable medium and comprising computer instructions for:

receiving live transactional compensation data, wherein the live transactional compensation data comprises a plurality of compensation factors associated with an employee;

determining, for the employee, an appropriate set of compensation assignment plans from a set of compensation plans based at least in part on the plurality of compensation factors associated with the employee;

determining a compensation scheme corresponding to the employee based at least in part on the appropriate set of compensation assignment plans;

providing a compensation model that is based on the compensation scheme, wherein the compensation model is based on a first compensation factor of the plurality of compensation factors, wherein the compensation model corresponding to the employee is configured to output a total compensation amount that is based on corresponding amounts associated with each of the compensation assignment plans included in the appropriate set of compensation assignment plans;

monitoring the live transactional compensation data for one or more changes;

determining that the first compensation factor that is based on the live transactional compensation data has changed; and in response to the determination that the first compensation factor that is based on the live transactional compensation data has changed, flagging and updating the compensation model.

* * * * *